United States Patent
Wolf et al.

(10) Patent No.: US 11,178,877 B2
(45) Date of Patent: Nov. 23, 2021

(54) **FORMULATION COMPRISING A BENEFICIAL *P. BILAII* STRAIN AND TALC FOR USE IN SEED TREATMENT**

(71) Applicant: BAYER CROPSCIENCE AKTIENGESELLSCHAFT, Monheim am Rhein (DE)

(72) Inventors: Arite Wolf, Schwaan (DE); Krista Anderson, Saskatoon (CA)

(73) Assignee: Bayer CropScience Aktiengesellschaft, Monheim am Rhein (DE)

( * ) Notice: Subject to any disclaimer, the term of this patent is extended or adjusted under 35 U.S.C. 154(b) by 0 days.

(21) Appl. No.: 16/319,621

(22) PCT Filed: Jul. 27, 2017

(86) PCT No.: PCT/EP2017/069002
§ 371 (c)(1),
(2) Date: Jan. 22, 2019

(87) PCT Pub. No.: WO2018/019937
PCT Pub. Date: Feb. 1, 2018

(65) Prior Publication Data
US 2020/0138039 A1    May 7, 2020

(30) Foreign Application Priority Data
Jul. 29, 2016   (EP) .................................... 16182005

(51) Int. Cl.
| | | |
|---|---|---|
| *A01N 63/30* | (2020.01) | |
| *A01N 59/06* | (2006.01) | |
| *A01C 1/06* | (2006.01) | |
| *A01C 21/00* | (2006.01) | |
| *A01N 63/36* | (2020.01) | |

(52) U.S. Cl.
CPC ............... *A01N 63/36* (2020.01); *A01C 1/06* (2013.01); *A01C 21/00* (2013.01); *A01N 59/06* (2013.01)

(58) Field of Classification Search
None
See application file for complete search history.

(56) References Cited

U.S. PATENT DOCUMENTS

| | | |
|---|---|---|
| 2012/0021906 A1 | 1/2012 | Sutton et al. |
| 2014/0143909 A1 | 5/2014 | Greenshields et al. |
| 2015/0264928 A1 | 9/2015 | Cristau et al. |
| 2015/0307409 A1 | 10/2015 | Hnatowich et al. |
| 2017/0215419 A1* | 8/2017 | Toapanta ............... A01N 43/56 |

FOREIGN PATENT DOCUMENTS

EP    2269455 A1    1/2011

OTHER PUBLICATIONS

International Search Report and Written Opinion on the International Searching Authority, PCT International Patent Application No. PCT/EP2017/069002, dated Sep. 25, 2017, 15 pages.

* cited by examiner

*Primary Examiner* — Alton N Pryor
(74) *Attorney, Agent, or Firm* — Michelle L. Samonek

(57) ABSTRACT

The present invention relates to a method of treating seed, comprising applying at least one plant treatment agent to said seed; and applying a dry formulation comprising/consisting of spores of *P. bilaii* and talc powder to said seed. The invention furthermore relates to a formulation for use in seed treatment comprising spores of *P. bilaii* and talc powder, seed treated with such formulation and methods of improving applicability and quality of *P. bilaii* spores and methods of improving plant growth, plant health or plant vigor.

13 Claims, No Drawings

FORMULATION COMPRISING A BENEFICIAL P. BILAII STRAIN AND TALC FOR USE IN SEED TREATMENT

CROSS-REFERENCE TO RELATED APPLICATION(S)

The present application is a 35 U.S.C. § 371 national phase entry of International Application No. PCT/EP2017/069002, filed Jul. 27, 2017, which claims the benefit under 35 U.S.C. § 119 of European Patent Application No. 16182005.5, filed Jul. 29, 2016, the entire contents of which are hereby incorporated herein by reference.

Phosphorus (P) availability is often low on farms. Phosphorus levels will decrease in soil due to crop removal without the use of amendments to re-supply P to the soil. Rock phosphates (RPs) are naturally occurring phosphorus minerals, generally accepted as phosphorus amendments in crop production. In calcareous soils, high pH and $CaCO_3$ content are major factors limiting agronomic efficiency of RPs. In rhizosphere soil, however, plant and microbial exudates may increase the availability of P from RPs. For example, protons (H+), released as a result of cation uptake by plants and microorganisms, directly decrease pH in their environment. Exuded organic acids also have been reported to dissolve P minerals directly and/or through complexation of the cationic partners of P, which are mainly Ca in RPs.

*Penicillium bilaii* (also known as *P. bilaji* or *P. bilaiae*) is a fungal inoculant originally isolated from southern Alberta soils (Kucey, 1983; Phosphate-solubilizing bacteria and fungi in various cultivated and virgin Alberta soils. Can. J. Soil. Sci. 63: 671-678; reviewed in Takeda and Knight; Solubilization of Rock Phosphate by *Penicillium bilaii*—Soil Phosphorus Management in Organic Crop Production. Soils and Crops Workshop 2003). *P. bilaii* has been shown to solubilize phosphorus minerals in soil and to enhance phosphorus availability to plants to a larger extent than other P-solubilizing microorganisms (Kucey, 1983; Asea et al., 1988; Inorganic phosphate solubilization by two Penicillium species in solution culture and soil. Soil Biol. Biochem. 20: 459-464). The organism can live in symbiosis with several plant species by enhancing phosphate uptake by the root structure while feeding off plant waste products. Native soil populations are often low and can be increased by application as an agricultural inoculant. Inoculation with *P. bilaii* increased P uptake by several plant species, including wheat and field beans (Gleddie et al., 1991; A summary of wheat response to Provide™ (*Penicillium bilaji*) in western Canada. Proc. Alberta Soil Science Workshop, Edmonton, Alberta. pp.306-313.; Kucey, 1987; Increased phosphorous uptake by wheat and field beans phosphorus-solubilizing *Penicillium bilaji* strain and with vesicular-arbuscular mycorrhizal fungi. Appl. Environ. Microbiol. 53(12):2699-2703), Canola (Gleddie et al., 1993; Effect of inoculation with *Penicillium bilaii* (Provide®) on phosphate uptake and yield of Canola in western Canada. Proc. Alberta Soil Science Workshop, Edmonton, Alberta. pp.155-160), and alfalfa (Schlechte et al., 1996; Response of alfalfa in the establishment year to inoculation with the phosphate-solubilizing fungus *Penicillium bilaii* (Provide®). Proc. Soils and Crops Workshop, Saskatoon, Saskatchewan. pp. 309-317).

There are several hypothesized mechanisms by which microorganisms enhance the dissolution of phosphorus minerals. For calcium phosphorus minerals such as rock phosphates, two mechanisms are considered most likely: 1) acidification by the exuded protons and organic acids and by the production of carbon dioxide, and 2) the complexation of cation partners of phosphorus by the exuded organic acids. *P. bilaii* is described to produce citric and oxalic acids and thus solubilizes calcium phosphate (Cunningham and Kuiack, 1992; Production of citric and oxalic acids and solubilization of calcium phosphate by *Penicillium bilaii*. Appl. Environ. Microbiol. 58(5):1451-1458.)

The use of formulations for enhancing nutrient use efficiency comprising biological agents (BCAs) such as *Penicillium bilaii* has become a valuable alternative in the field of agronomy. The provision of suitable formulations for biological agents nevertheless still pose a challenge due to the many factors contributing to the efficacy of the final formulation such as form of the biological agent, temperature stability and shelf life as well as effect of the formulation in the application.

Suitable formulations are homogeneous and stable mixtures of active and inert ingredients which make the final product simpler, safer, and more efficacious to apply to a target. Commonly used additives in formulations include surfactants such as dispersants or wetting agents, solvents, emulsifiers, defoamers and stabilizers. Commonly used formulations for biological agents include WP, a solid formulation micronized to powder form and typically applied as suspended particles after dispersion in water, and WG, a formulation consisting of granules to be applied after disintegration and dispersion in water.

*Penicillium bilaii* is widely used in seed treatment and different formulation types are available for this application. The product Jumpstart® (Novozymes) is sold in the form of a wettable powder (WP) that must be mixed into water and then applied to the seed. The product Recover™ PO4 (Brett Young) is a liquid formulation in the form of a dispersible concentrate (DC) which has to be agitated in order to resuspend the fungal spores evenly in the product before application to the seed. Shelf life of fungal products is still a property which could be improved in order to provide a more stable product which can easily be applied to the seeds.

Accordingly, with the disadvantages described above there is still the need for a simple, easy to handle formulation recipe for *Penicillium bilaii* suitable for seed treatment. Among other properties, such formulations shall ideally provide a good physical stability in the formulation concentrate, exhibit a suitable shelf life over time and ensure a superior distribution of the biological agent in seed treatment.

In a first aspect, the present invention relates to a method of treating seed, comprising a) applying a liquid comprising at least one seed treatment agent to said seed; and b) applying a dry formulation comprising or consisting of spores of the fungus *Penicillium bilaii* and talc powder to said seed.

In a second aspect a dry formulation comprising spores of the fungus *Penicillium bilaii* and talc powder is provided.

Seeds are typically treated in the timeframe between their harvest and before sowing them in a future vegetation period, preferably the following vegetation period.

All strains of *P. bilaii* with phosphate solubilizing or other plant beneficial properties can be used in the present invention. Samples of *Penicillium bilaii* have previously been deposited at the American Type Culture Collection in Rockville, Md., USA under the deposit number ATCC 22348 (1974 edition of the ATCC catalogue) and ATCC18309. A further isolate of this fungus has been discovered in soil from a location in Southern Alberta, Canada. This strain has previously been shown to improve P-solubilizing activity compared to the earlier strains deposited at the ATCC. A deposit of this strain was made at the ATCC under the deposit number 20851 in accordance with the terms of the Budapest Treaty. In this deposit the fungus was named *P. bilaji* and the taxonomic details and its use has been described in U.S. Pat. No. 5,026,417. This strain has now been re-deposited as NRRL 50169. A new isolate of *P. bilaii* has been discovered in Australia. It was originally isolated in 2002 from wheat roots and grown in collected soil samples from Coonalpyn in South Australia (Wakelin et al., 2004. Biol Fertil Soils 40:36-43). A deposit of this strain was made as deposit number NRRL 50162. A further *P. bilaii* strain RS7B-SD1 is described in Wakelin et al. 2007 (The effect of Penicillium fungi on plant growth and phosphorus mobilization in neutral to alkaline soils from southern Australia. Can J Microbiol. 53(1):106-115). In one embodiment the *P. bilaii* strain is derived from deposits selected from the group comprising of strains ATCC 22348, ATCC18309, ATCC 20851, NRRL 50169, NRRL 50162, RS7B-SD1, DSM 32334.

Talc is a clay mineral composed of hydrated magnesium silicate, for example with the chemical formula $H_2Mg_3(SiO_3)_4$ or $Mg_3Si_4O_{10}(OH)_2$.

In the liquid according to the invention at least one or more seed treatment agents may be present.

Seed treatment agents comprise all agents which may be applied to seeds prior to sowing and may be for example a plant protection agent in different formulation types, a plant growth promoting agent, a seed coating agent or an inoculant.

Shelf life of spores, in particular of *P. bilaii* is measured by determining the amount of colony forming units (cfu) as described below.

The present invention may be applied to seed of any crop plant. Crop plants may be plants which can be obtained by conventional breeding and optimization methods or by biotechnological and genetic engineering methods or combinations of these methods, including the transgenic plants and including the plant cultivars which are protectable and non-protectable by plant breeders' rights. Non-limiting examples for such crop plants include cotton, flax, grapevine, fruit, vegetables, such as *Rosaceae* sp. (for example pome fruits such as apples and pears, but also stone fruits such as apricots, cherries, almonds and peaches, and soft fruits such as strawberries), *Ribesioidae* sp., *Juglandaceae* sp., *Betulaceae* sp., *Anacardiaceae* sp., *Fagaceae* sp., *Moraceae* sp., *Oleaceae* sp., *Actinidaceae* sp., *Lauraceae* sp., *Musaceae* sp. (for example banana trees and plantations), *Rubiaceae* sp. (for example coffee), *Theaceae* sp., *Sterculiceae* sp., *Rutaceae* sp. (for example lemons, oranges and grapefruit); *Solanaceae* sp. (for example tomatoes), *Liliaceae* sp., *Asteraceae* sp. (for example lettuce), *Umbelliferae* sp., *Cruciferae* sp., *Chenopodiaceae* sp., *Cucurbitaceae* sp. (for example cucumber), *Alliaceae* sp. (for example leek, onion), *Papilionaceae* sp. (for example peas); major crop plants, such as *Gramineae* sp. (for example maize, turf, cereals such as wheat, rye, rice, barley, oats, millet and triticale), *Asteraceae* sp. (for example sunflower), *Brassicaceae* sp. (for example white cabbage, red cabbage, broccoli, cauliflower, Brussels sprouts, pak choi, kohlrabi, radishes, and oilseed rape, mustard, horseradish and cress), *Fabacae* sp. (for example bean, peanuts), *Papilionaceae* sp. (for example soya bean), *Solanaceae* sp. (for example potatoes), *Chenopodiaceae* sp. (for example sugar beet, fodder beet, swiss chard, beetroot); useful plants and ornamental plants for gardens and wooded areas; and genetically modified varieties of each of these plants.

Preferred crops are oilseed rape, in particular Canola, wheat, soybean, sugar beet, beans, corn, alfalfa, peas, lentils, flax and barley. The method of treating seed with the dry formulation comprising spores of *P. bilaii* and talc powderis most preferably applied to oilseed rape, in particular to winter oilseed rape or spring oilseed rape. Oilseed rape refer to seeds and plant of the genus *Brassica* (*Brassica napus, Brassica rapa* or *Brassica juncea*). Preferred is the application on Canola seed.

"Canola" refers herein to seeds or plants of the genus *Brassica* (*Brassica napus, Brassica rapa* or *Brassica juncea*) from which the oil shall contain less than 2% erucic acid in its fatty acid profile and the solid component shall contain less than 30 micromoles of any one or any mixture of 3-butenyl glucosinolate, 4-pentenyl glucosinolate, 2-hydroxy-3 butenyl glucosinolate, and 2-hydroxy-4-pentenyl glucosinolate per gram of air-dry, oil-free solid.

In the method described, the dry formulation is applied to a seed. Although it is believed that the present method may be applied to a seed in any physiological state, it is preferred that the seed be in a sufficiently durable state that it incurs no damage during the treatment process. Typically, the seed would be a seed that had been harvested from the field; removed from the plant; and separated from any cob, stalk, outer husk, and surrounding pulp or other non-seed plant material. The seed would preferably also be biologically stable to the extent that the treatment would cause no biological damage to the seed. In one embodiment, for example, the treatment can be applied to seed such as Canola seed that has been harvested, cleaned and dried to a moisture content below about 15% by weight. In an alternative embodiment, the seed may be one that has been dried and then primed with water and/or another material before the treatment with the current formulation. Within the limitations just described, it is believed that the treatment may be applied to the seed at any time between harvest of the seed and sowing of the seed. As used herein, the term "unsown seed" is meant to include seed at any period between the harvest of the seed and the sowing of the seed in the ground for the purpose of germination and growth of the plant.

In a first aspect, the present invention relates to a method of treating seed, comprising, prior to sowing a. applying a liquid comprising at least one seed treatment agent to said seed; and b. applying a dry formulation comprising or consisting of spores of the fungus *Penicillium bilaii* and talc powder to said seed.

The treatment of seeds may be achieved in different manners.

The liquid applied to the seed may contain one or more seed treatment agents being for example plant protection agents in different formulation types, plant growth promoting agents, seed coating agents or inoculants. The dry formulation comprising of spores of the fungus *Penicillium bilaii* and talc powder may be applied simultaneously or shortly after applying the liquid to said seed, thereby wetting the seed in a sufficient manner and allowing the dry formulation comprising of spores of the fungus *Penicillium bilaii* and talc powder to adhere to the seed. Preferably the liquid comprises at least one plant protection agent.

When it is said that unsown seed is "treated" with the composition, such treatment is not meant to include those practices in which the formulation is applied to the soil, rather than to the seed. For example, such treatments as the application of the pesticide in bands, "T"-bands, or in-furrow, at the same time as the seed is sowed are not considered to be included in the present invention.

The formulation of the present invention may be applied to seeds by any standard seed treatment methodology, including but not limited to mixing in a container (e.g., a bottle or bag), mechanical application or tumbling.

After application of the formulation according to the invention, the seed may be coated using conventional coating techniques and machines, such as fluidized bed techniques, the roller mill method, rotostatic seed treaters, and drum coaters. Other methods, such as spouted beds may also be useful. The seeds may be presized before coating. After coating, the seeds are typically dried and then transferred to a sizing machine for sizing. Such procedures are known in the art.

The seeds treated with the formulation according to the invention may also be enveloped with a film overcoating to protect the pesticide coating. Such overcoatings are known in the art and may be applied using conventional fluidized bed and drum film coating techniques.

The spores of *P. bilaii* may be spores of any *P. bilaii* strain which has beneficial effects on plants. Preferably, the *P. bilaii* strain used in the present invention enhances phosphorous use efficiency of plants. Suitable strains include, without limitation the *P. bilaii* strain deposited under ATCC20851 and other strains as listed below.

The fungus *Penicillium bilaii* is a known micro-organism that has previously been deposited at the American Type Culture Collection in Rockville, Md., USA under the deposit number ATCC 22348 (1974 edition of the ATCC catalogue). In the 1984 catalogue, the same deposit number is used for *P. bilaii* and a further strain is identified by the deposit number ATCC 18309.

Further isolates of this fungus have been discovered in soil from a location (latitude 49 degree 48' N, longitude 113 degree. 6' W) in Southern Alberta, Canada. This strain has previously been shown to improved P-solubilizing activity compared to the earlier strains deposited at the ATCC. A deposit of this improved strain was made at the ATCC under the deposit number 20851 in accordance with the terms of the Budapest Treaty. In this deposit the fungus was named *P. bilaii* and the taxonomic details and its use have been described in U.S. Pat. No. 5,026,417. This strain was re-deposited under the terms of the Budapest Treaty with the Agricultural Research Service Patent Culture Collection (NRRL), Northern Regional Research Center, 1815 N. University Street, Peoria, Ill., 61604, USA on Aug. 28, 2008 as NRRL 50169 and with the Deutsche Sammlung von Mikroorganismen and Zellkulturenas DSM 32334.

Another *P. bilaii* strain was deposited under the terms of the Budapest Treaty with the Agricultural Research Service Patent Culture Collection (NRRL), Northern Regional Research Center, 1815 N. University Street, Peoria, Ill., 61604, USA on Aug. 11, 2008, and given the accession number: NRRL 50162.

Spores of *P. bilaii* may be conveniently produced by liquid or solid-state fermentation.

The *Penicillium* fungus according to the invention and in particular the specific strains as mentioned above may be grown using solid state or liquid fermentation and a suitable carbon source. *Pencillium bilaii* isolates may be grown using any suitable methods known to the person skilled in the art. For example, the fungus may be cultured on a solid growth medium such as potato dextrose agar or malt extract agar, or in flasks containing suitable liquid media such as Czapek-Dox medium or potato dextrose broth. These culture methods may be used in the preparation of an inoculum of *Penicillium* spp. for coating seeds.

Solid state production of *Penicillium* spores may be achieved by inoculating a solid medium such as a peat or vermiculite-based substrate, or grains including, but not limited to, oats, wheat, barley, or rice. The sterilized medium (achieved through autoclaving or irradiation) is inoculated with a spore suspension (such as $1\times10^2$ – $1\times10^7$ cful ml) of the appropriate *Penicillium* spp. and the moisture adjusted to 20 to 50%, depending on the substrate. The material is incubated for 2 to 8 weeks at appropriate temperature until a feasible spore formation occurred. The spores are separated from the solid medium (substrate) and cleaned to obtain a pure spore powder. Suitable separation and cleaning methods are known in the art.

The spores may also be produced by liquid fermentation (Cunningham et al., 1990. Can J Bot 68:2270-2274). Liquid production may be achieved by cultivating the fungus in any suitable media, such as potato dextrose broth or sucrose yeast extract media, under appropriate pH and temperature conditions as known in the art.

The resulting material may be harvested, concentrated by centrifugation, formulated, and then dried using air drying, freeze drying, or fluid bed drying techniques to produce a spore powder (Friesen T., Hill G., Pugsley T., Holloway G., and Zimmerman D., 2005; Experimental determination of viability loss of *Penicillium bilaiae* conidia during convective air-drying. Appl Microbial Biotechnol 68:397-404).

The spore powder is then mixed with talc powder and applied to the surface of seeds, optionally after said seed have been treated with another plant protection agent.

The present formulation comprising spores of *P. bilaii* and talc powder may provide several advantages. The formulation supports a faster drying of the liquid applied in step a) which may comprise one or more plant protection agents. It may be applied as a dry formulation while the Jumpstart product needs to be dissolved in water and is then applied, generating an extra step and additional liquid which needs to be dried down from the seeds eventually. In addition, it was surprisingly found that the dry formulation comprising spores of *P. bilaii* and talc powder produces less dust in the Heubach testing approach as compared to other *P. bilaii* products which means less exposure of the environment before and during seeding of treated seeds. As shown in the appended examples, the formulation used in seed treatment also provides for a comparable viability after seed treatment and a comparable germination rate The formulation may also enhance the shelf life of *P. bilaii* on the treated seeds. The spores are preferably stable in the formulation according to the invention at 4° C. and 20° C. for 6 months..

Furthermore, the formulation of the present invention greatly facilitates seed treatment, even more so when the seeds are treated with a liquid formulation comprising a plant protection or plant growth promoting agent before.

Said at least one plant protection agent may be applied using methods well-known in the art. For example, a plant protection agent such as penflufen, which is usually and preferably formulated in a liquid formulation may be mixed with appropriate additives for seed treatment and then be applied to clean seed according to methods well known in the art. This procedure is followed by the application of the formulation of the present invention. The latter application preferably takes place when the previously applied liquid formulation has not completely dried on the seeds, in other words when the seeds are still slightly humid.

In one embodiment seed coating agents are used in the liquid of step a).

Seed coating agent may be polymers, one example is HP-9-10.

In a preferred embodiment, said at least one plant protection or plant growth promoting agent is a chemical plant protection or plant growth promoting agent.

Such chemical plant protection or plant growth promoting agent may be any agent which can be applied in seed treatment. Such agent may belong to one or more of fungicides, bactericides, nematicides, insecticides, herbicides, fertilizers, phytotonics, sterilants, safeners, semiochemicals and/or plant growth regulators, in order thus, for example, to broaden the spectrum of action, to prolong the duration of action, to increase the rate of action, to prevent repulsion or prevent evolution of resistance.

Suitable insecticides include (1) Acetylcholinesterase (AChE) inhibitors, such as, for example, carbamates, for example alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb; or organophosphates, for example acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(2) GABA-gated chloride channel blockers, such as, for example, cyclodiene-organochlorines, for example chlordane and endosulfan or phenylpyrazoles (fiproles), for example ethiprole and fipronil.

(3) Sodium channel modulators, such as, for example, pyrethroids, e.g. acrinathrin, allethrin, d-cis-trans allethrin, d-trans allethrin, bifenthrin, bioallethrin, bioallethrin s-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans-isomer], deltamethrin, empenthrin [(EZ)-(1R)-isomer], es fenvalerate, etofenprox, fenpropathrin, fenvalerate, flucythrinate, flumethrin, tau-fluvalinate, halfenprox, imiprothrin, kadethrin, momfluorothrin, permethrin, phenothrin [(1R)-trans-isomer], prallethrin, pyrethrins (pyrethrum), resmethrin, silafluofen, tefluthrin, tetramethrin, tetramethrin [(1R)- isomer)], tralomethrin and transfluthrin or DDT or methoxychlor.

(4) Nicotinic acetylcholine receptor (nAChR) competitive modulators, such as, for example, neonicotinoids, e.g. acetamiprid, clothianidin, dinotefuran, imidacloprid, nitenpyram, thiacloprid and thiamethoxam or nicotine or sulfoxaflor or flupyradifurone.

(5) Nicotinic acetylcholine receptor (nAChR) allosteric modulators, such as, for example, spinosyns, e.g. spinetoram and spinosad.

(6) Glutamate-gated chloride channel (GluCl) allosteric modulators, such as, for example, avermectins/milbemycins, for example abamectin, emamectin benzoate, lepimectin and milbemectin.

(7) Juvenile hormone mimics, such as, for example, juvenile hormone analogues, e.g. hydroprene, kinoprene and methoprene or fenoxycarb or pyriproxyfen.

(8) Miscellaneous non-specific (multi-site) inhibitors, such as, for example, alkyl halides, e.g. methyl bromide and other alkyl halides; or chloropicrine or sulphuryl fluoride or borax or tartar emetic or methyl isocyanate generators, e.g. diazomet and metam.

(9) Modulators of Chordotonal Organs, such as, for example pymetrozine or flonicamid.

(10) Mite growth inhibitors, such as, for example clofentezine, hexythiazox and diflovidazin or etoxazole.

(11) Microbial disruptors of the insect gut membrane, such as, for example *Bacillus thuringiensis* subspecies *israelensis*, *Bacillus sphaericus*, *Bacillus thuringiensis* subspecies *aizawai*, *Bacillus thuringiensis* subspecies *kurstaki*, *Bacillus thuringiensis* subspecies *tenebrionis*, and B.t. plant proteins: Cry1Ab, Cry1Ac, Cry1Fa, Cry1A.105, Cry2Ab, Vip3A, mCry3A, Cry3Ab, Cry3Bb, Cry34Ab1/35Ab1.

(12) Inhibitors of mitochondrial ATP synthase, such as, ATP disruptors such as, for example, diafenthiuron or organotin compounds, for example azocyclotin, cyhexatin and fenbutatin oxide or propargite or tetradifon.

(13) Uncouplers of oxidative phosphorylation via disruption of the proton gradient, such as, for example, chlorfenapyr, DNOC and sulfluramid.

(14) Nicotinic acetylcholine receptor channel blockers, such as, for example, bensultap, cartap hydrochloride, thiocylam, and thiosultap-sodium.

(15) Inhibitors of chitin biosynthesis, type 0, such as, for example, bistrifluron, chlorfluazuron, diflubenzuron, flucycloxuron, flufenoxuron, hexaflumuron, lufenuron, novaluron, noviflumuron, teflubenzuron and triflumuron.

(16) Inhibitors of chitin biosynthesis, type 1, for example buprofezin.

(17) Moulting disruptor (in particular for Diptera, i.e. dipterans), such as, for example, cyromazine.

(18) Ecdysone receptor agonists, such as, for example, chromafenozide, halofenozide, methoxyfenozide and tebufenozide.

(19) Octopamine receptor agonists, such as, for example, amitraz.

(20) Mitochondrial complex III electron transport inhibitors, such as, for example, hydramethylnone or acequinocyl or fluacrypyrim.

(21) Mitochondrial complex I electron transport inhibitors, such as, for example from the group of the METI acaricides, e.g. fenazaquin, fenpyroximate, pyrimidifen, pyridaben, tebufenpyrad and tolfenpyrad or rotenone (Derris).

(22) Voltage-dependent sodium channel blockers, such as, for example indoxacarb or metaflumizone.

(23) Inhibitors of acetyl CoA carboxylase, such as, for example, tetronic and tetramic acid derivatives, e.g. spirodiclofen, spiromesifen and spirotetramat.

(24) Mitochondrial complex IV electron transport inhibitors, such as, for example, phosphines, e.g. aluminium phosphide, calcium phosphide, phosphine and zinc phosphide or cyanides, e.g. calcium cyanide, potassium cyanide and sodium cyanide.

(25) Mitochondrial complex II electron transport inhibitors, such as, for example, beta-ketonitrile derivatives, e.g. cyenopyrafen and cyflumetofen and carboxanilides, such as, for example, pyflubumide.

(28) Ryanodine receptor modulators, such as, for example, diamides, e.g. chlorantraniliprole, cyantraniliprole and flubendiamide, further active compounds such as, for example, Afidopyropen, Afoxolaner, Azadirachtin, Benclothiaz, Benzoximate, Bifenazate, Broflanilide, Bromopropylate, Chinomethionat, Chloroprallethrin, Cryolite, Cyclaniliprole, Cycloxaprid, Cyhalodiamide, Dicloromezotiaz, Dicofol, epsilon-Metofluthrin, epsilon-Momfluthrin, Flometoquin, Fluazaindolizine, Fluensulfone, Flufenerim, Flufenoxystrobin, Flufiprole, Fluhexafon, Fluopyram, Fluralaner, Fluxametamide, Fufenozide, Guadipyr, Heptafluthrin, Imidaclothiz, Iprodione, kappa-Bifenthrin, kappa-Tefluthrin, Lotilaner, Meperfluthrin, Paichongding, Pyridalyl, Pyrifluquinazon, Pyriminostrobin, Spirobudiclofen, Tetramethylfluthrin, Tetraniliprole, Tetrachlorantraniliprole, Tioxazafen, Thiofluoximate, Triflumezopyrim and iodomethane; furthermore preparations based on *Bacillus firmus* (1-1582, BioNeem, Votivo), and also the following compounds: 1-{2-fluoro-4-methyl-5-[(2,2,2-trifluoroethyl)sulphinyl]phenyl}-3-(trifluoromethyl)-1H-1,2,4-triazole-5-amine (known from WO2006/043635) (CAS 885026-50-6), {1'-[(2E)-3-(4-chlorophenyl)prop-2-en-1-yl]-5-fluorospiro[indol-3,4'-piperidin]-1(2H)-yl}(2-chloropyridin-4-yl)methanone (known from WO2003/106457) (CAS 637360-23-7), 2-chloro-N-[2-{1-[(2E)-3-(4-chlorophenyl)prop-2-en-1-yl]piperidin-4-yl}-4-(trifluoromethyl)phenyl]isonicotinamide (known from WO2006/003494) (CAS 872999-66-1), 3-(4-chloro-2,6-dimethylphenyl)-4-hydroxy-8-methoxy-1,8-diazaspiro[4.5]dec-3-en-2-one (known from WO 2010052161) (CAS 1225292-17-0), 3-(4-chloro-2,6-dimethylphenyl)-8-methoxy-2-oxo-1,8-diazaspiro[4.5]dec-3-en-4-yl ethyl carbonate (known from EP2647626) (CAS 1440516-42-6), 4-(but-2-yn-1-yloxy)-6-(3,5-dimethylpiperidin-1-yl)-5-fluoropyrimidine (known from WO2004/099160) (CAS 792914-58-0), PF1364 (known from JP2010/018586) (CAS 1204776-60-2), N-[(2E)-1-[(6-chloropyridin-3-yl)methyl]pyridin-2(1H)-ylidene]-2,2,2-trifluoroacetamide (known from WO2012/029672) (CAS 1363400-41-2), (3E)-3-[1-[(6-chloro-3-pyridyl)methyl]-2-pyridylidene]-1,1,1-trifluoro-propan-2-one (known from WO2013/144213) (CAS 1461743-15-6), N-[3-(benzylcarbamoyl)-4-chlorophenyl]-1-methyl-3-(pentafluoroethyl)-4-(trifluoromethyl)-1H-pyrazole-5-carboxamide (known from WO2010/051926) (CAS 1226889-14-0), 5-bromo-4-chloro-N-[4-chloro-2-methyl-6-(methylcarbamoyl)phenyl]-2-(3-chloro-2-pyridyl)pyrazole-3-carboxamide (known from CN103232431) (CAS 1449220-44-3), 4-[5-(3,5-dichlorophenyl)-4,5-dihydro-5-(trifluoromethyl)-3-isoxazolyl]-2-methyl-N-(cis-1-oxido-3-thietanyl)-benzamide, 4-[5-(3,5-dichlorophenyl)-4,5-dihydro-5-(trifluoromethyl)-3-isoxazolyl]-2-methyl-N-(trans-1-oxido-3-thietanyl)-benzamide and 4-[(5S)-5-(3,5-dichlorophenyl)-4,5-dihydro-5-(trifluoromethyl)-3-isoxazolyl]-2-methyl-N-(cis-1-oxido-3-thietanyl)benzamide (known from WO 2013/050317 A1) (CAS 1332628-83-7), N-[3-chloro-1-(3-pyridinyl)-1H-pyrazol-4-yl]-N-ethyl-3-[(3,3,3-trifluoropropyl)sulfinyl]-propanamide, (+)-N-[3-chloro-1-(3-pyridinyl)-1H-pyrazol-4-yl]-N-ethyl-3-[(3,3,3-trifluoropropyl)sulfinyl]-propanamide and (−)-N-[3-chloro-1-(3-pyridinyl)-1H-pyrazol-4-yl]-N-ethyl-3-[(3,3,3-trifluoropropyl)sulfinyl]-propanamide (known from WO 2013/162715 A2, WO 2013/162716 A2, US 2014/0213448 A1) (CAS 1477923-37-7), 5-[[(2E)-3-chloro-2-propen-1-yl]amino]-1-[2,6-dichloro-4-(trifluoromethyl)phenyl]-4-[(trifluoromethyl)sulfinyl]-1H-pyrazole-3-carbonitrile (known from CN 101337937 A) (CAS 1105672-77-2), 3-bromo-N-[4-chloro-2-methyl-6-[(methylamino)thioxomethyl]phenyl]-1-(3-chloro-2-pyridinyl)-1H-pyrazole-5-carboxamide, (Liudaibenjiaxuanan, known from CN 103109816 A) (CAS 1232543-85-9); N-[4-chloro-2-[[(1,1-dimethylethyl) amino]carbonyl]-6-methylphenyl]-1-(3-chloro-2-pyridinyl)-3-(fluoromethoxy)-1H-Pyrazole-5-carboxamide (known from WO 2012/034403 A1) (CAS 1268277-22-0), N-[2-(5-amino-1,3,4-thiadiazol-2-yl)-4-chloro-6-methylphenyl]-3-bromo-1-(3-chloro-2-pyridinyl)-1H-pyrazole-5-carboxamide (known from WO 2011/085575 A1) (CAS 1233882-22-8), 4-[3-[2,6-dichloro-4-[(3,3-dichloro-2-propen-1-yl)oxy]phenoxy]propoxy]-2-methoxy-6-(trifluoromethyl)-pyrimidine (known from CN 101337940 A) (CAS 1108184-52-6); (2E)- and 2(Z)-2-[2-(4-cyanophenyl)-1-[3-(trifluoromethyl)phenyl]ethylidene]-N-[4-(difluoromethoxy)phenyl]-hydrazinecarboxamide (known from CN 101715774 A) (CAS 1232543-85-9); 3-(2,2-dichloroethenyl)-2,2-dimethyl-4-(1H-benzimidazol-2-yl)phenyl-cyclopropanecarboxylic acid ester (known from CN 103524422 A) (CAS 1542271-46-4); (4aS)-7-chloro-2,5-dihydro-2-[[(methoxycarbonyl)[4-[(trifluoromethyl)thio]phenyl]amino]carbonyl]-indeno[1,2-e][1,3,4]oxadiazine-4a(3H)-carboxylic acid methyl ester (known from CN 102391261 A) (CAS 1370358-69-2); 6-deoxy-3-O-ethyl-2,4-di-O-methyl-, 1-[N-[4-[1-[4-(1,1,2,2,2-pentafluoroethoxy)phenyl]-1H-1,2,4-triazol-3-yl]phenyl]carbamate]-α-L-mannopyranose (known from US 2014/0275503 A1) (CAS 1181213-14-8); 8-(2-cyclopropylmethoxy-4-trifluoromethyl-phenoxy)-3-(6-trifluoromethyl-pyridazin-3-yl)-3-aza-bicyclo[3.2.1]octane (CAS 1253850-56-4), (8-anti)-8-(2-cyclopropylmethoxy-4-trifluoromethyl-phenoxy)-3-(6-trifluoromethyl-pyridazin-3-yl)-3-aza-bicyclo[3.2.1]octane (CAS 933798-27-7), (8-syn)-8-(2-cyclopropylmethoxy-4-trifluoromethyl-phenoxy)-3-(6-trifluoromethyl-pyridazin-3-yl)-3-aza-bicyclo[3.2.1]octane (known from WO 2007040280 A1, WO 2007040282 A1) (CAS 934001-66-8) and N-[3-chloro-1-(3-pyridinyl)-1H-pyrazol-4-yl]-N-ethyl-3-[(3,3,3-trifluoropropyl)thio]-propanamide (known from WO 2015/058021 A1, WO 2015/058028 A1) (CAS 1477919-27-9).

Suitable fungicides include

1) Inhibitors of the ergosterol biosynthesis, for example (1.001) cyproconazole, (1.002) difenoconazole, (1.003) epoxiconazole, (1.004) fenhexamid, (1.005) fenpropidin, (1.006) fenpropimorph, (1.007) fenpyrazamine, (1.008) fluquinconazole, (1.009) flutriafol, (1.010) imazalil, (1.011) imazalil sulfate, (1.012) ipconazole, (1.013) metconazole, (1.014) myclobutanil, (1.015) paclobutrazol, (1.016) prochloraz, (1.017) prop iconazole, (1.018) prothioconazole, (1.019) Pyrisoxazole, (1.020) spiroxamine, (1.021) tebuconazole, (1.022) tetra conazole, (1.023) triadimenol, (1.024) tridemorph, (1.025) triticonazole, (1.026) (1R,2S,5S)-5-(4-chlorobenzyl)-2-(chloromethyl)-2-methyl-1-(1H-1,2,4-triazol-1-ylmethyl)cyclopentanol, (1.027) (1S,2R,5R)-5-(4-chlorobenzyl)-2-(chloromethyl)-2-methyl-1-(1H-1,2,4-triazol-1-ylmethyl)cyclopentanol, (1.028) (2R)-2-(1-chloro cyclopropyl)-4-[(1R)-2,2-dichlorocyclopropyl]-1-(1H-1,2,4-triazol-1-yl)butan- 2-ol, (1.029) (2R)-2-(1-chloro cyclopropyl)-4-[(1S)-2,2-dichlorocyclopropyl]-1-(1H-1,2,4-triazol-1-yl)butan-2-ol, (1.030) (2R)-2-[4-(4-chlorophenoxy)-2-(trifluoromethyl)phenyl]-1-(1H-1,2,4-triazol-1-yl)propan-2-ol, (1.031) (2S)-2-(1-chlorocyclopropyl)-4-[(1R)-2,2-dichlorocyclopropyl]-1-(1H-1,2,4-triazol-1-yl)butan-2-ol, (1.032) (2S)-2-(1-chlorocyclopropyl)-4-[(1S)-2,2-dichlorocyclopropyl]-1-(1H-1,2,4-triazol-1-yl)butan-2-ol, (1.033) (2S)-2-[4-(4-chlorophenoxy)-2-(trifluoromethyl)phenyl]-1-(1H-1,2,4-triazol-1-yl)propan-2-ol, (1.034) (R)-[3-(4-chloro-2-fluorophenyl)-5-(2,4-difluorophenyl)-1,2-oxazol-4-yl](pyridin-3-yl)methanol, (1.035) (S)-[3-(4-chloro-2-fluorophenyl)-5-(2,4-difluorophenyl)-1,2-oxazol-4-yl](pyridin-3-yl)methanol, (1.036) [3-(4-chloro-2-fluorophenyl)-5-(2,4-difluorophenyl)-1,2-oxazol-4-yl](pyridin-3-yl)methanol, (1.037) 1-({(2R,4S)-2-[2-chloro-4-(4-chlorophenoxy)phenyl]-4-methyl-1,3-dioxolan-2-yl}methyl)-1H-1,2,4-triazole, (1.038) 1-({(2S,4S)-2-[2-chloro-4-(4-chlorophenoxy)phenyl]-4-methyl-1,3-dioxolan-2-yl}methyl)-1H-1,2,4-triazole, (1.039) 1-{[3-(2-chlorophenyl)-2-(2,4-difluorophenyl)oxiran-2-yl]methyl}-1H-1,2,4-triazol-5-yl thiocyanate, (1.040) 1-{[rel(2R,3R)-3-(2-chlorophenyl)-2-(2,4-difluorophenyl)oxiran-2-yl]methyl}-1H-1,2,4-triazol-5-yl thiocyanate, (1.041) 1-{[rel(2R,3S)-3-(2-chlorophenyl)-2-(2,4-difluorophenyl)oxiran-2-yl]methyl}-1H-1,2,4-triazol-5-yl thiocyanate, (1.042) 2-[(2R,4R,5R)-1-(2,4-dichlorophenyl)-5-hydroxy-2,6,6-trimethylheptan-4-yl]-2,4-dihydro-3H-1,2,4-triazole-3-thione, (1.043) 2-[(2R,4R,5S)-1-(2,4-dichlorophenyl)-5-hydroxy-2,6,6-trimethylheptan-4-yl]-2,4-dihydro-3H-1,2,4-triazole-3-thione, (1.044) 2-[(2R,4S,5R)-1-(2,4-dichlorophenyl)-5-hydroxy-2,6,6-trimethylheptan-4-yl]-2,4-dihydro-3H-1,2,4-triazole-3-thione, (1.045) 2-[(2R,4S,5S)-1-(2,4-dichlorophenyl)-5-hydroxy-2,6,6-trimethylheptan-4-yl]-2,4-dihydro-3H-1,2,4-triazole-3-thione, (1.046) 2-[(2S,4R,5R)-1-(2,4-dichlorophenyl)-5-hydroxy-2,6,6-trimethylheptan-4-yl]-2,4-dihydro-3H-1,2,4-triazole-3-thione, (1.047) 2-[(2S,4R,5S)-1-(2,4-dichlorophenyl)-5-hydroxy-2,6,6-trimethylheptan-4-yl]-2,4-dihydro-3H-1,2,4-triazole-3-thione, (1.048) 2-[(2S,4S,5R)-1-(2,4-dichlorophenyl)-5-hydroxy-2,6,6-trimethylheptan-4-yl]-2,4-dihydro-3H-1,2,4-triazole-3-thione, (1.049) 2-[(2S,4S,5S)-1-(2,4-dichlorophenyl)-5-hydroxy-2,6,6-trimethylheptan-4-yl]-2,4-dihydro-3H-1,2,4-triazole-3-thione, (1.050) 2-[1-(2,4-dichlorophenyl)-5-hydroxy-2,6,6-trimethylheptan-4-yl]-2,4-dihydro-3H-1,2,4-triazole-3-thione, (1.051) 2-[2-chloro-4-(2,4-dichlorophenoxy)phenyl]-1-(1H-1,2,4-triazol-1-yl)propan-2-ol, (1.052) 2-[2-chloro-4-(4-chlorophenoxy)phenyl]-1-(1H-1,2,4-triazol-1-yl)butan-2-ol, (1.053) 2-[4-(4-chlorophenoxy)-2-(trifluoromethyl)phenyl]-1-(1H-1,2,4-triazol-1-yl)butan-2-ol, (1.054) 2-[4-(4-chlorophenoxy)-2-(trifluoromethyl)phenyl]-1-(1H-1,2,4-triazol-1-yl)pentan-2-ol, (1.055) 2-[4-(4-chlorophenoxy)-2-(trifluoromethyl)phenyl]-1-(1H-1,2,4-triazol-1-yl)propan-2-ol, (1.056) 2-{[3-(2-chlorophenyl)-2-(2,4-difluorophenyl)oxiran-2-yl]methyl}-2,4-dihydro-3H-1,2,4-triazole-3-thione, (1.057) 2-{[rel(2R,3R)-3-(2-chlorophenyl)-2-(2,4-difluorophenyl)oxiran-2-yl]methyl}-2,4-dihydro-3H-1,2,4-triazole-3-thione, (1.058) 2-{[rel(2R,3S)-3-(2-chlorophenyl)-2-(2,4-difluorophenyl)oxiran-2-yl]methyl}-2,4-dihydro-3H-1,2,4-triazole-3-thione, (1.059) 5-(4-chlorobenzyl)-2-(chloromethyl)-2-methyl-1-(1H-1,2,4-triazol-1-ylmethyl)cyclopentanol, (1.060) 5-(allylsulfanyl)-1-{[3-(2-chlorophenyl)-2-(2,4-difluorophenyl)oxiran-2-yl]methyl}-1H-1,2,4-triazole, (1.061) 5-(allylsulfanyl)-1-{[rel(2R,3R)-3-(2-chlorophenyl)-2-(2,4-difluorophenyl)oxiran-2-yl]methyl}-1H-1,2,4-triazole, (1.062) 5-(allylsulfanyl)-1-{[rel(2R,3S)-3-(2-chlorophenyl)-2-(2,4-difluorophenyl)oxiran-2-yl]methyl}-1H-1,2,4-triazole, (1.063) N'-(2,5-dimethyl-4-{[3-(1,1,2,2-tetrafluoroethoxy)phenyl]sulfanyl}phenyl)-N-ethyl-N-methylimidoformamide, (1.064) N'-(2,5-dimethyl-4-{[3-(2,2,2-trifluoroethoxy)phenyl]sulfanyl}phenyl)-N-ethyl-N-methylimidoformamide, (1.065) N'-(2,5-dimethyl-4-{[3-(2,2,3,3-tetrafluoropropoxy)phenyl]sulfanyl}phenyl)-N-ethyl-N-methylimidoformamide, (1.066) N'-(2,5-dimethyl-4-{[3-(pentafluoroethoxy)phenyl]sulfanyl}phenyl)-N-ethyl-N-methylimidoformamide, (1.067) N'-(2,5-dimethyl-4-{3-[(1,1,2,2-tetrafluoroethyl)sulfanyl]phenoxy}phenyl)-N-ethyl-N-methylimidoformamide, (1.068) N'-(2,5-dimethyl-4-{3-[(2,2,2-trifluoroethyp-sulfanyl]phenoxy}phenyl)-N-ethyl-N-methylimidoformamide, (1.069) N'-(2,5-dimethyl-4-{3-[(2,2,3,3-tetrafluoropropyl)sulfanyl]phenoxy}phenyl)-N-ethyl-N-methylimidoformamide, (1.070) N'-(2,5-dimethyl-4-{3-[(pentafluoroethyl)sulfanyl]phenoxy}phenyl)-N-ethyl-N-methylimidoformamide, (1.071) N'-(2,5-dimethyl-4-phenoxyphenyl)-N-ethyl-N-methylimidoformamide, (1.072) N'-(4-{[3-(difluoromethoxy)phenyl]sulfanyl}-2,5-dimethylphenyl)-N-ethyl-N-methylimidoformamide, (1.073) N'-(4-{3-[(difluoromethyl)sulfanyl]phenoxy}-2,5-dimethylphenyl)-N-ethyl-N-methylimidoformamide, (1.074) N'-[5-bromo-6-(2,3-dihydro-1H-inden-2-yloxy)-2-methylpyridin-3-yl]-N-ethyl-N-methylimidoformamide, (1.075) N'-{4-[(4,5-dichloro-1,3-thiazol-2-yl)oxy]-2,5-dimethylphenyl}-N-ethyl-N-methylimidoformamide, (1.076) N'-{5-bromo-6-[(1R)-1-(3,5-difluorophenyl)ethoxy]-2-methylpyridin-3-yl}-N-ethyl-N-methylimidoformamide, (1.077) N'-{5-bromo-6-[(1S)-1-(3,5-difluorophenyl)ethoxy]-2-methylpyridin-3-yl}-N-ethyl-N-methylimidoformamide, (1.078) N'-{5-bromo-6-[(cis-4-isopropylcyclohexyl)oxy]-2-methylpyridin-3-yl}-N-ethyl-N-methylimidoformamide, (1.079) N'-{5-bromo-6-[(trans-4-isopropylcyclohexyl)oxy]-2-methylpyridin-3-yl}-N-ethyl-N-methylimidoformamide, (1.080) N'-{5-bromo-6-[1-(3,5-difluorophenyl)ethoxy]-2-methylpyridin-3-yl}-N-ethyl-N-methylimidoformamide.

2) Inhibitors of the respiratory chain at complex I or II, for example (2.001) benzovindiflupyr, (2.002) bixafen, (2.003) boscalid, (2.004) carboxin, (2.005) fluopyram, (2.006) flutolanil, (2.007) fluxapyroxad, (2.008) furametpyr, (2.009) Isofetamid, (2.010) isopyrazam (anti-epimeric enantiomer 1R,4S,9S), (2.011) isopyrazam (anti-epimeric enantiomer 1S,4R,9R), (2.012) isopyrazam (anti-epimeric racemate 1RS,4SR,9SR), (2.013) isopyrazam (mixture of syn-epimeric racemate 1RS,4SR,9RS and anti-epimeric racemate 1RS,4SR,9SR), (2.014) isopyrazam (syn-epimeric enantiomer 1R,4S,9R), (2.015) isopyrazam (syn-epimeric enantiomer 1S,4R,9S), (2.016) isopyrazam (syn-epimeric racemate 1RS,4SR,9RS), (2.017) penflufen, (2.018) penthiopyrad, (2.019) pydiflumetofen, (2.020) Pyrazifumid, (2.021) sedaxane, (2.022) 1,3-dimethyl-N-(1,1,3-trimethyl-2,3-dihydro-1H-inden-4-yl)-1H-pyrazole-4-carboxamide, (2.023) 1,3-dimethyl-N-[(3R)-1,1,3-trimethyl-2,3-dihydro-1H-inden-4-yl]-1H-pyrazole-4-carboxamide, (2.024) 1,3-dimethyl-N-[(3S)-1,1,3-trimethyl-2,3-dihydro-1H-inden-4-yl]-1H-pyrazole-4-carboxamide, (2.025) 1-methyl-3-(trifluoromethyl)-N-[2'-(trifluoromethyl)biphenyl-2-yl]-1H-pyrazole-4-carboxamide, (2.026) 2-fluoro-6-(trifluoromethyl)-N-(1,1,3-trimethyl-2,3-dihydro-1H-inden-4-yl)benzamide, (2.027) 3-(difluoromethyl)-1-methyl-N-(1,1,3-trimethyl-2,3-dihydro-1H-inden-4-yl)-1H-pyrazole-4-carboxamide, (2.028) 3-(difluoromethyl)-1-methyl-N-[(3R)-1,1,3-trimethyl-2,3-dihydro-1H-inden-4-yl]-1H-pyrazole-4-carboxamide, (2.029) 3-(difluoromethyl)-1-methyl-N-[(3S)-1,1,3-trimethyl-2,3-dihydro-1H-inden-4-yl]-1H-pyrazole-4-carboxamide, (2.030) 3-(difluoromethyl)-N-(7-fluoro-1,1,3-trimethyl-2,3-dihydro-1H-inden-4-yl)-1-methyl-1H-pyrazole-4-carboxamide, (2.031) 3-(difluoromethyl)-N-[(3R)-7-fluoro-1,1,3-trimethyl-2,3-dihydro-1H-inden-4-yl]-1-methyl-1H-pyrazole-4-carboxamide, (2.032) 3-(difluoromethyl)-N-[(3S)-7-fluoro-1,1,3-trimethyl-2,3-dihydro-1H-inden-4-yl]-1-methyl-1H-pyrazole-4-carboxamide, (2.033) 5,8-difluoro-N-[2-(2-fluoro-4-{[4-(trifluoromethyl)pyridin-2-yl]oxy}phenyl)ethyl]quinazolin-4-amine, (2.034) N-(2-cyclopentyl-5-fluorobenzyl)-N-cyclopropyl-3-(difluoromethyl)-5-fluoro-1-methyl-1H-pyrazole-4-carboxamide, (2.035) N-(2-tert-butyl-5-methylbenzyl)-N-cyclopropyl-3-(difluoromethyl)-5-fluoro-1-methyl-1H-pyrazole-4-carboxamide, (2.036) N-(2-tert-butylbenzyl)-N-cyclopropyl-3-(difluoromethyl)-5-fluoro-1-methyl-1H-pyrazole-4-carboxamide, (2.037) N-(5-chloro-2-ethylbenzyl)-N-cyclopropyl-3-(difluoromethyl)-5-fluoro-1-methyl-1H-pyrazole-4-carboxamide, (2.038) N-(5-chloro-2-isopropylbenzyl)-N-cyclopropyl-3-(difluoromethyl)-5-fluoro-1-methyl-1H-pyrazole-4-carboxamide, (2.039) N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide, (2.040) N-[(1S,4R)-9-(dichloromethylene)-1,2,3,4-tetrahydro-1,4-methanonaphthalen-5-yl]-3-(difluoromethyl)-1-methyl-1H-pyrazole-4-carboxamide, (2.041) N-[1-(2,4-dichlorophenyl)-1-methoxypropan-2-yl]-3-(difluoromethyl)-1-methyl-1H-pyrazole-4-carboxamide, (2.042) N-[2-chloro-6-(trifluoromethyl)benzyl]-N-cyclopropyl-3-(difluoromethyl)-5-fluoro-1-methyl-1H-pyrazole-4-carboxamide, (2.043) N-[3-chloro-2-fluoro-6-(trifluoromethyl)benzyl]-N-cyclopropyl-3-(difluoromethyl)-5-fluoro-1-methyl-1H-pyrazole-4-carboxamide, (2.044) N-[5-chloro-2-(trifluoromethyl)benzyl]-N-cyclopropyl-3-(difluoromethyl)-5-fluoro-1-methyl-1H-pyrazole-4-carboxamide, (2.045) N-cyclopropyl-3-(difluoromethyl)-5-fluoro-1-methyl-N-[5-methyl-2-(trifluoromethyl)benzyl]-1H-pyrazole-4-carboxamide, (2.046) N-cyclopropyl-3-(difluoromethyl)-5-fluoro-N-(2-fluoro-6-isopropylbenzyl)-1-methyl-1H-pyrazole-4-carboxamide, (2.047) N-cyclopropyl-3-(difluoromethyl)-5-fluoro-N-(2-isopropyl-5-methylbenzyl)-1-methyl-1H-pyrazole-4-carboxamide, (2.048) N-cyclopropyl-3-(difluoromethyl)-5-fluoro-N-(2-isopropylbenzyl)-1-methyl-1H-pyrazole-4-carbothioamide, (2.049) N-cyclopropyl-3-(difluoromethyl)-5-fluoro-N-(2-isopropylbenzyl)-1-methyl-1H-pyrazole-4-carboxamide, (2.050) N-cyclopropyl-3-(difluoromethyl)-5-fluoro-N-(5-fluoro-2-isopropylbenzyl)-1-methyl-1H-pyrazole-4-carboxamide, (2.051) N-cyclopropyl-3-(difluoromethyl)-N-(2-ethyl-4,5-dimethylbenzyl)-5-fluoro-1-methyl-1H-pyrazole-4-carboxamide, (2.052) N-cyclopropyl-3-(difluoromethyl)-N-(2-ethyl-5-fluorobenzyl)-5-fluoro-1-methyl-1H-pyrazole-4-carboxamide, (2.053) N-cyclopropyl-3-(difluoromethyl)-N-(2-ethyl-5-methylbenzyl)-5-fluoro-1-methyl-1H-pyrazole-4-carboxamide, (2.054) N-cyclopropyl-N-(2-cyclopropyl-5-fluorobenzyl)-3-(difluoromethyl)-5-fluoro-1-methyl-1H-pyrazole-4-carboxamide, (2.055) N-cyclopropyl-N-(2-cyclopropyl-5-methylbenzyl)-3-(difluoromethyl)-5-fluoro-1-methyl-1H-pyrazole-4-carboxamide, (2.056) N-cyclopropyl-N-(2-cyclopropylbenzyl)-3-(difluoromethyl)-5-fluoro-1-methyl-1H-pyrazole-4-carboxamide.

3) Inhibitors of the respiratory chain at complex III, for example (3.001) ametoctradin, (3.002) amisulbrom, (3.003) azoxystrob in, (3.004) coumethoxystrob in, (3.005) coumoxystrob in, (3.006) cyazofamid, (3.007) dimoxystrob in, (3.008) enoxastrob in, (3.009) famoxadone, (3.010) fenamidone, (3.011) flufenoxystrob in, (3.012) fluoxastrobin, (3.013) kresoxim-methyl, (3.014) metominostrobin, (3.015) orysastrobin, (3.016) picoxystrobin, (3.017) pyra clo strob in, (3.018) pyrametostrob in, (3.019) pyraoxystrobin, (3.020) trifloxystrobin, (3.021) (2E)-2-{2-[({[(1E)-1-(3-{[(E)-1-fluoro-2-phenylvinyl]oxy}phenyl)ethylidene]amino}oxy)methyl]phenyl}-2-(methoxyimino)-N-methylacetamide, (3.022) (2E,3Z)-5-{[1-(4-chlorophenyl)-1H-pyrazol-3-yl]oxy}-2-(methoxyimino)-N,3-dimethylpent-3-enamide, (3.023) (2R)-2-{2-[(2,5-dimethylphenoxy)methyl]phenyl}-2-methoxy-N-methylacetamide, (3.024) (2S)-2-{2-[(2,5-dimethylphenoxy)methyl]phenyl}-2-methoxy-N-methylacetamide, (3.025) (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl 2-methylpropanoate, (3.026) 2-{2-[(2,5-dimethylphenoxy)methyl]phenyl}-2-methoxy-N-methylacetamide, (3.027) N-(3-ethyl-3,5,5-trimethylcyclohexyl)-3-formamido-2-hydroxybenzamide, (3.028) (2E,3Z)-5-{[1-(4-chloro-2-fluorophenyl)-1H-pyrazol-3-yl]oxy}-2-(methoxyimino)-N,3-dimethylpent-3-enamide.

4) Inhibitors of the mitosis and cell division, for example (4.001) carbendazim, (4.002) diethofencarb, (4.003) ethaboxam, (4.004) fluopicolide, (4.005) pencycuron, (4.006) thiabendazole, (4.007) thiophanate-methyl, (4.008) zoxamide, (4.009) 3-chloro-4-(2,6-difluorophenyl)-6-methyl-5-phenylpyridazine, (4.010) 3-chloro-5-(4-chlorophenyl)-4-(2,6-difluorophenyl)-6-methylpyridazine, (4.011) 3-chloro-5-(6-chloropyridin-3-yl)-6-methyl-4-(2,4,6-trifluorophenyl)pyridazine, (4.012) 4-(2-bromo-4-fluorophenyl)-N-(2,6-difluorophenyl)-1,3-dimethyl-1H-pyrazol-5-amine, (4.013) 4-(2-bromo-4-fluorophenyl)-N-(2-bromo-6-fluorophenyl)-1,3-dimethyl-1H-pyrazol-5-amine, (4.014) 4-(2-bromo-4-fluorophenyl)-N-(2-bromophenyl)-1,3-dimethyl-1H-pyrazol-5-amine, (4.015) 4-(2-bromo-4-fluorophenyl)-N-(2-chloro -6-fluorophenyl)-1,3-dimethyl-1H-pyrazol-5-amine, (4.016) 4-(2-bromo-4-fluorophenyl)-N-(2-chlorophenyl)-1,3-dimethyl-1H-pyrazol-5-amine, (4.017) 4-(2-bromo-4-fluorophenyl)-N-(2-fluorophenyl)-1,3-dimethyl-1H-pyrazol-5-amine, (4.018) 4-(2-chloro-4-fluorophenyl)-N-(2,6-difluorophenyl)-1,3-dimethyl-1H-pyrazol-5-amine, (4.019) 4-(2-chloro-4-fluorophenyl)-N-(2- chloro-6-fluorophenyl)-1,3-dimethyl-1H-pyrazol-5-amine, (4.020) 4-(2-chloro-4-fluorophenyl)-N-(2-chlorophenyl)-1,3-dimethyl-1H-pyrazol-5-amine, (4.021) 4-(2-chloro-4-fluorophenyl)-N-(2-fluorophenyl)-1,3-dimethyl-1H-pyrazol-5-amine, (4.022) 4-(4-chlorophenyl)-5-(2,6-difluorophenyl)-3,6-dimethylpyridazine, (4.023) N-(2-bromo-6-fluorophenyl)-4-(2-chloro-4-fluorophenyl)-1,3-dimethyl- 1H-pyrazol-5-amine, (4.024) N-(2-bromophenyl)-4-(2-chloro-4-fluorophenyl)-1,3-dimethyl-1H-pyrazol-5-amine, (4.025) N-(4-chloro-2,6-difluorophenyl)-4-(2-chloro-4-fluorophenyl)-1,3-dimethyl-1H-pyrazol-5-amine.

5) Compounds capable to have a multisite action, for example (5.001) bordeaux mixture, (5.002) captafol, (5.003) captan, (5.004) chlorothalonil, (5.005) copper hydroxide, (5.006) copper naphthenate, (5.007) copper oxide, (5.008) copper oxychloride, (5.009) copper(2+) sulfate, (5.010) dithianon, (5.011) dodine, (5.012) folpet, (5.013) mancoz eb, (5.014) maneb, (5.015) metiram, (5.016) metiram zinc, (5.017) oxine-copper, (5.018) propineb, (5.019) sulfur and sulfur preparations including calcium polysulfide, (5.020) thiram, (5.021) zineb, (5.022) ziram.

6) Compounds capable to induce a host defence, for example (6.001) acibenzolar-S-methyl, (6.002) isotianil, (6.003) probenazole, (6.004) tiadinil.

7) Inhibitors of the amino acid and/or protein biosynthesis, for example (7.001) cyprodinil, (7.002) kasugamycin, (7.003) kasugamycin hydrochloride hydrate, (7.004) oxytetracycline, (7.005) pyrimethanil, (7.006) 3-(5-fluoro-3,3,4,4-tetramethyl-3,4-dihydroisoquinolin-1-yl)quinoline.

8) Inhibitors of the ATP production, for example (8.001) silthiofam.

9) Inhibitors of the cell wall synthesis, for example (9.001) benthiavalicarb, (9.002) dimethomorph, (9.003) flumorph, (9.004) iprovalicarb, (9.005) mandipropamid, (9.006) pyrimorph, (9.007) valifenalate, (9.008) (2E)-3-(4-tert-butylphenyl)-3-(2-chloropyridin-4-yl)-1-(morpholin-4-yl)prop-2-en-1-one, (9.009) (2Z)-3-(4-tert-butylphenyl)-3-(2-chloropyridin-4-yl)-1-(morpholin-4-yl)prop-2-en-1-one.

10) Inhibitors of the lipid and membrane synthesis, for example (10.001) propamocarb, (10.002) propamocarb hydrochloride, (10.003) tolclofos-methyl.

11) Inhibitors of the melanin biosynthesis, for example (11.001) tricyclazole, (11.002) 2,2,2-trifluoroethyl {3-methyl-1-[(4-methylbenzoyl)amino]butan-2-yl}carbamate.

12) Inhibitors of the nucleic acid synthesis, for example (12.001) benalaxyl, (12.002) benalaxyl-M (kiralaxyl), (12.003) metalaxyl, (12.004) metalaxyl-M (mefenoxam).

13) Inhibitors of the signal transduction, for example (13.001) fludioxonil, (13.002) iprodione, (13.003) procymidone, (13.004) proquinazid, (13.005) quinoxyfen, (13.006) vinclozolin.

14) Compounds capable to act as an uncoupler, for example (14.001) fluazinam, (14.002) meptyldinocap.

15) Further compounds, for example (15.001) Abscisic acid, (15.002) benthiazole, (15.003) bethoxazin, (15.004) capsimycin, (15.005) carvone, (15.006) chinomethionat, (15.007) cufraneb, (15.008) cyflufenamid, (15.009) cymoxanil, (15.010) cyprosulfamide, (15.011) flutianil, (15.012) fosetyl-aluminium, (15.013) fosetyl-calcium, (15.014) fos etyl-sodium, (15.015) methyl isothiocyanate, (15.016) metrafenone, (15.017) mildiomycin, (15.018) natamycin, (15.019) nickel dimethyldithiocarbamate, (15.020) nitrothal-isopropyl, (15.021) oxamocarb, (15.022) Oxathiapiprolin, (15.023) oxyfenthiin, (15.024) pentachlorophenol and salts, (15.025) phosphorous acid and its salts, (15.026) propamocarb-fosetylate, (15.027) pyriofenone (chlazafenone), (15.028) tebufloquin, (15.029) tecloftalam, (15.030) tolnifanide, (15.031) 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (15.032) 1-(4-{4-[(5S)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (15.033) 2-(6-benzylpyridin-2-yl)quinazoline, (15.034) 2,6-dimethyl-1H,5H-[1,4]dithiino[2,3-c:5,6-c']dipyrrole-1,3,5,7(2H,6H)-tetrone, (15.035) 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}- 1,3-thiazol-2-yl)piperidin-1-yl]ethanone, (15.036) 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol- 3-yl}-1,3-thiazol-2-yl)piperidin-1-yl]ethanone, (15.037) 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol- 3-yl}-1,3-thiazol-2-yl)piperidin-1-yl]ethanone, (15.038) 2-[6-(3-fluoro-4-methoxyphenyl)-5-methylpyridin-2-yl]quinazoline, (15.039) 2-{(5R)-3-[2-(1-{[3,5-bis(difluoromethyl)-1H-pyrazol-1-yl]acetyl}piperidin-4-yl)-1,3-thiazol-4-yl]-4,5-dihydro-1,2- oxazol-5-yl}-3-chlorophenyl methanesulfonate, (15.040) 2-{(5S)-3-[2-(1-{[3,5-bis(difluoromethyl)-1H-pyrazol-1-yl]acetyl}piperidin-4-yl)-1,3-thiazol-4-yl]-4,5-dihydro-1,2- oxazol-5-yl}-3-chlorophenyl methanesulfonate, (15.041) 2-{2-[(7,8-difluoro-2-methylquinolin-3-yl)oxy]-6-fluorophenyl}propan-2-ol, (15.042) 2-{2-fluoro-6-[(8-fluoro-2-methylquinolin-3-yl)oxy]phenyl}propan-2-ol, (15.043) 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5- yl}-3-chlorophenyl methanesulfonate, (15.044) 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}phenyl methanesulfonate, (15.045) 2-phenylphenol and salts, (15.046) 3-(4,4,5-trifluoro-3,3-dimethyl-3,4-dihydroisoquinolin-1-yl)quinoline, (15.047) 3-(4,4-difluoro-3,3-dimethyl-3,4-dihydroisoquinolin-1-yl)quinoline, (15.048) 4-amino-5-fluoropyrimidin-2-ol (tautomeric form: 4-amino-5-fluoropyrimidin-2(1H)-one), (15.049) 4-oxo-4-[(2-phenylethyl)amino]butanoic acid, (15.050) 5-amino-1,3,4-thiadiazole-2-thiol, (15.051) 5-chloro-N'-phenyl-N'-(prop-2-yn-1-yl) thiophene-2-sulfonohydrazide, (15.052) 5-fluoro-2-[(4-fluorobenzyl)oxy]pyrimidin-4-amine, (15.053) 5-fluoro-2-[(4-methylbenzyl)oxy]pyrimidin-4-amine, (15.054) 9-fluoro-2,2-dimethyl-5-(quinolin-3-yl)-2,3-dihydro-1,4-benzoxazepine, (15.055) but-3-yn-1-yl {6-[({[(Z)-(1-methyl-1H-tetrazol-5-yl)(phenyl)methylene]amino}oxy)methyl]pyridin-2-yl}carbamate, (15.056) ethyl (2Z)-3-amino-2-cyano-3-phenylacrylate, (15.057) phenazine-1-carboxylic acid, (15.058) propyl 3,4,5-trihydroxybenzoate, (15.059) quinolin-8-ol, (15.060) quinolin-8-ol sulfate (2:1), (15.061) tert-butyl {6-[({[(1-methyl-1H-tetrazol-5-yl)(phenyl)methylene]amino}oxy)methyl]pyridin-2- yl}carbamate.

Suitable safeners include benoxacor, cloquintocet (-mexyl), cyometrinil, cyprosulfamide, dichlormid, fenchlorazole (-ethyl), fenclorim, flurazole, fluxofenim, furilazole, isoxadifen (-ethyl), mefenpyr (-diethyl), nap hthalic anhydride, oxabetrinil, 2-methoxy-N-({4-[(methylcarbamoyl)amino]phenyl}sulphonyl)benzamide (CAS 129531-12-0), 4-(dichloroacetyl)-1-oxa-4-azaspiro [4.5]decane (CAS 71526-07-3), 2,2,5-trimethyl-3-(dichloroacetyl)-1,3-oxazolidine (CAS 52836-31-4).

In a more preferred embodiment, said at least one chemical agent is selected from the group comprising azoxystrobin, benzovindiflupyr, boscalid, cyprodinil, fludioxonil, fluxapyroxad, iprodione, metalaxyl, mefenoxam, metconazole, penthiopyrad, picoxystrobin, propiconazole, prothioconazole, pyraclostrobin, sedaxane, tebuconazole, penflufen, clothianidin, trifloxystrobin, cyantraniliprole, fluquiconazole, fluopyram, fluoxastrobin, flupyradifurone, thiamethoxam, chlorantraniliprole, sulfloxaflor, metalaxyl-m, fludioxonil, difenoconazole, sedaxane, penflufen, penthiopyrad, picoxystrobin, picarbutrazox, ethaboxam, chlorantraniliprole, chlorpyrifos, deltamethrin, dimethoate, imidacloprid, cyazypyr, cyhalothrin-lambda, permethrin, spirotetramate, tetraniliprole. and/or a biological agent selected from the group comprising *Bacillus subtilis* strain QST713, *Bacillus subtilis* strain GB03, *Bacillus firmus* strain 1-1582, *Bacillus pumilus* strain QST 2808, *Bacillus pumilus* strain GB34, *Bacillus subtilis* strain MB600, or a combination thereof.

It is most preferred that said at least one chemical agent comprises penflufen.

In another preferred embodiment, said at least one plant protection or plant growth promoting agent is a biological control agent.

Such biological control agents (BCA) or plant growth promoting agents may be any agent which may be applied in seed treatment. Such BCA may belong to the group of bacteria such as root colonizing bacteria, fungi, yeasts, viruses, protozoa or extracts (e.g. plant or algal extracts).

Suitable bacteria include *Agrobacterium* strains, *Bacillus thuringiensis* strains, *Bacillus subtilis* strains, *Bacillus amyloliquiefaciens* strains, *Bacillus firmus* strains and *Bacillus pumilus* strains, but also *Rhizobium* and *Bradyrhizobium* strains.

Suitable fungal biological control agents or plant growth promoting agents include different ascomycetes with known beneficial effects (e.g. *Trichoderma, Clonostachys*, such as *Clonostachys rosea, Talaromyces*, such as *Talaromyces flavus, Beauveria*, such as *Beauveria bassiana, Metharizium*, such as *Metarhizium anisopliae, Purpureocillium lilacinum, Paecilomyces fumosoroseus*) *Isaria* species, eg *Isaria lilacinus* and mycorrhizal strains.

In one embodiment the biological control agent is selected from the group comprising *Bacillus subtilis* strain QST713, *Bacillus subtilis* strain GB03, *Bacillus firmus* strain I-I582, *Bacillus pumilus* strain QST 2808, *Bacillus pumilus* strain GB34, *Bacillus subtilis* strain MB600, or a combination thereof.

In a more preferred embodiment, said at least one plant protection agent comprises *Bacillus subtilis* strain QST713 (Accession No. NRRL B-21661), (products known as Serenade QST 713®, Serenade Soil and Serenade Max from Bayer Crop Science), *Bacillus subtilis* strain GB03 (Accession No. ATCC SD-1397), (product known as Kodiak® from Bayer Crop Science, DE), *Bacillus firmus* strain I-I582 (products known as Bionem or VOTIVO from Bayer Crop-Science), *Bacillus pumilus* strain QST 2808 (Accession No. NRRL B-30087), (products known as Sonata QST 2808® from Bayer Crop Science), *Bacillus pumilus* strain GB34 (Accession No. ATCC 700814), (products known as Yield Shield® from Bayer Crop Science, DE), *Bacillus subtilis* strain MB600 (products known as Subtilex or HiStick N/T from Becker Underwood), or a combination thereof.

In another aspect, the present invention relates to a formulation for use in seed treatment comprising spores of *P. bilaii* and talc powder.

The preferred embodiments as described for the first aspect of the present invention are also applicable to this aspect of the invention.

In a preferred embodiment, the formulation consists of spores of *P. bilaii* and talc powder.

Suitable strains of *P. bilaii* are listed elsewhere in this description.

In another preferred embodiment, the spores are present in the formulation according to the invention in an amount of between $1\times10^6$cfu/g to $1\times10^{11}$cfu/g. Further suitable ranges include those between $1\times10^7$cfu/g to $1\times10^{10}$cfu/g, preferably $5\times10^6$cfu/g to $5\times10^9$cfu/g, such as $6\times10^6$cfu/g, $7\times10^6$cfu/g, $8\times10^6$cfu/g, $9\times10^6$cfu/g, $1\times10^7$cfu/g, $2\times10^7$cfu/g, $3\times10^7$cfu/g, $4\times10^7$cfu/g, $5\times10^7$cfu/g, $1\times10^8$cfu/g, $5\times10^8$cfu/g, $1\times10^9$cfu/g, $2\times10^9$cfu/g, $3\times10^9$cfu/g, $4\times10^9$cfu/g and any value in between those values and ranges.

In another preferred embodiment, the ratio of spores and talc powder (as expressed in weight units) is between 1:100 and 1:10, preferably between 1:50 and 1:10, such as 1:40, 1:30, 1:29, 1:28, 1:27, 1:26, 1:25, 1:24, 1:23: 1:22, 1:21, 1:20 or any ratio in between these ratios.

In a preferred embodiment of the method of treating seeds with a dry formulation comprising spores of *P. bilaii* and talc powder, in step b. said seed is treated with a formulation according to the invention. Accordingly, preferred embodiments described for the dry formulation comprising spores of *P. bilaii* and talc powder are also applicable to the respective method described herein and vice versa.

In yet another aspect, the present invention relates to seed (dormant, primed, pregerminated, transgenic) treated with a dry formulation comprising spores of *P. bilaii* and talc powder, wherein said formulation is attached to said seed. In other words, the formulation comprising or consisting of spores of *P. bilaii* is attached or coated to the seed.

The present invention also provides a seed that has been treated by the method described herein.

The treated seeds may be used for the propagation of plants in the same manner as conventional treated seed. The treated seeds may be stored, handled, sowed and tilled in the same manner as any other pesticide treated seed. Appropriate safety measures should be taken to limit contact of the treated seed with humans, food or feed materials, water and birds and wild or domestic animals.

Another aspect of the present invention relates to a method of enhancing the shelf life of *P. bilaii* spores comprising providing dried *P. bilaii* spores and mixing them with talc powder in a ratio of between 1:100 and 1:10 with more specific ranges and values described elsewhere in this application. The dry formulation comprising spores of *P. bilaii* and talc powder may be used in this aspect of the invention.

Further, the present invention relates to a method of improving plant growth, plant health or plant vigor comprising growing seed obtained by the method of treating seeds according to the invention, or seed according to the invention.

The present invention is illustrated by the following examples in a non-limiting fashion.

Example 1: Production of a Talc-Based Formulation of *P. Bilaii*

Spores of *P. bilaii* strain deposited under DSMZ 32334 were obtained from solid-state fermentation and separation from the fermentation substrate. 40 g of spores were mixed with 960 g of talc powder to obtain the talc-based formulation.

Example 2: Seed Treatment with the Formulation According to the Invention

Canola seed previously treated with a liquid composition comprising penflufen, clothianidin, metalaxyl, trifloxystrobin (commercialized as Prosper Evergol, Bayer CropScience), were treated with the formulation according to Example 1 when they were still sufficiently humid to make the formulation stick to the seeds.

Application rates range from 2.5 gr to 12.5 grams /kg of seed to result in a concentration of viable fungal spores of at least 1 to $5 \times 10^9$ spores per kg.

Example 3: Viability of *P. Bilaii* in the Dry Formulation Comprising Spores of *P. Bilaii* and Talc Powder Viability of *P. bilaii* spores is determined by measuring the amount of colony forming units (cfu). The method of the determination of the number of viable spores is based on the determination of colony-forming-units (cfu) per gram of sample. The sample is suspended in sterile Aqua dest. and diluted to suitable dilution steps. Subsamples of the dilution steps are plated on petri dishes with a solid potato-dextrose-agar. The petri dishes are incubated at 25° C. for 5-7 days until fungal colonies appear. According to the number of counted colonies and the dilution steps the cfu per gram sample is calculated.

The spore content of a formulation obtained according to the protocol of Example 1 was measured and was at least $4 \times 10^9$ viable spores/ g. while Jumpstart comprises $7.2 \times 10^8$ per gram of formulated product. Samples of the formulation were stored at 4, 20 and 30° C. for 6 months and the viability of the spores tested once per month. Viability of the fungal spores at 4° C. and 20° C. did not significantly decrease after 6 months.

Example 4: Heubach Dust Off Testing for 2 Canola Seedlots with Different Thousand Seed Weight (tsw)

The seeds were treated according to the invention with different amounts of a formulation according to the invention (comprising 4 w.-% *P. bilaii* spores, corresponding to $4.53 \times 10^9$ cfu/g) and different concentrations of the commercially available product Jumpstart ($1.63 \times 10^9$ cfu/g), also comprising talc as drying agent, each followed by coating step with mica 300 g/100 kg. Treatment was done in cold temperature.

The methodology is based on the approved European Seed Association (ESA) test method for analyzing dust generation.

Treated seeds were mechanically stressed inside a rotating drum. A vacuum pump creates an air flow through the rotating drum, the connected glass cylinder and the attached filter unit. By the air flow, abraded dust particles are transported out of the rotating drum through the glass cylinder and subsequently through the filter unit. Coarse non-floating particles are separated and collected in the glass cylinder while floating dust particles are deposited onto a filter. The amount of floating dust collected on the filter is determined gravimetrically.

A starting sample must consist of at least 500 g +/−5% of seeds. A subsample (100±1 grams) of treated seed was weighed and transferred into the metal drum of the Heubach device. The drum was then correctly closed, reassembled, and connected to the glass cylinder. A glass fiber filter disc (Whatman GF 92 or similar specification) was placed in the filter unit. The filter unit including the filter disc was weighed, placed on the glass cylinder and connected to the vacuum tube. The "time" option (2 min) was selected from the control panel and the rotation cycle started. After completion of the run, the filter unit including the filter disc was removed from the glass cylinder and weighed in the same manner as described before. The test was conducted on 3 subsamples. After each measurement, all components which are in contact with seed or dust (ie. rotating drum, glass cylinder, filter unit) were cleaned using a vacuum cleaner with a pointed nozzle.

The Heubach dust value is expressed in g/100 kg of treated seeds. The following formula is used to convert the measured result to the Heubach dust value:

$$\text{Heubach dust value} = \frac{(W_1 - W_0) \aleph 100.000}{W_s} [\text{g}/100 \text{ kg}]$$

where:
W1=weight of the loaded filter unit incl. filter disc [g]
W0=weight of the empty filter unit incl. filter disc [g]
WS=weight of the treated seeds [g]

|  |  |  | Calculated grams of dust/100 kg | |
|---|---|---|---|---|
| Trt # | Treatment description | | Variety 1 tsw ~6.5 g | Variety 2 tsw ~3.5 g |
| 1 | Prosper Evergol + talc (500 g/100 kg) | Current commercial application | 1.1924 | 0.6324 |
| 2 | Prosper Evergol + [(*P. bilaii* spores + talc) (250 g/100 kg)] | Replace talc with *P. bilaii* spores + talc, low rate | 0.4397 | 0.3428 |
| 3 | Prosper Evergol + [(*P. bilaii* spores + talc) (1250 g/100 kg)] | talc replaced with high application rate of *P. bilaii* spores + talc | 0.3799 | 0.3032 |
| 4 | Prosper Evergol + Jumpstart 63 g slurry + talc (500 g/100 kg) | Low rate comparison - delivers similar number of spores JS* vs dry formulation | 1.2795 | 0.6496 |

-continued

| Trt # | Treatment description | | Calculated grams of dust/100 kg | |
|---|---|---|---|---|
| | | | Variety 1 tsw ~6.5 g | Variety 2 tsw ~3.5 g |
| 5 | Prosper Evergol + Jumpstart 315 g slurry + talc (500 g/100 kg) + mica (300 g/100 k) | High rate comparison - delivers similar number of spores JS vs dry formulation | 4.0917 | 1.1627 |
| 6 | Prosper Evergol + Jumpstart 80 g slurry + talc (500 g/100 kg) + mica (300 g/100 k) | Current commercial application | 1.4683 | 0.4659 |

*JS = Jumpstart

Treatments 2 and 4 as well as 3 and 5 comprise comparable amounts of *P. bilaii* spores, respectively. Treatment 6 corresponds to the recommended application rate.

According to the table shown above, treatment of seeds with the dry formulation as described herein results in less dust generation due to abrasion of seed treatment material, in particular when high spore amounts are used. As seed treatment in Canada may be performed on seeds having a temperature below 0 degree C., the use of less liquid, in particular aequous liquid in the formulation of the present invention will increase the efficiency and feasibility of the treatment process.

Example 5: Germination Testing for 2 Canola Seedlots

The seeds treated in Example 4 were assessed for germination rates.

The methodology is based on the approved International Seed Testing Assocation (ISTA) test methods.

Individual 10 cm×10 cm plastic germination trays with friction sealing lids were prepared by cleaning and then placing an appropriately sized blue blotter into each tray. 50 seeds were taken at random from each treatment sample and spaced uniformly and adequately apart on top of the moistened substrate using a vacuum counter. 4 trays were set up for each treatment for a total of 200 seeds per treatment. Trays were incubated in a closed cabinet set at 20 degrees C. and a 12 hour day/night light/dark cycle. Germination evaluations for canola were made 7 days after planting and according to ISTA guidelines. To be assessed as a normal seedling the seedling must have all their essential structures well developed, complete, in proportion and healthy.

| Trt # | Treatment Description | Variety 1 | Variety 2 | Average |
|---|---|---|---|---|
| 1 | Prosper Evergol + talc (500 g/100 kg) | 82.5 | 92.5 | 87.5 |
| 2 | Prosper Evergol + [(*P. bilaii* spores + talc) (250 g/100 kg)] | 78 | 94.5 | 86.25 |
| 3 | Prosper Evergol + [(*P. bilaii* spores + talc) (1250 g/100 kg)] | 81.5 | 93 | 87.25 |
| 4 | Prosper Evergol + Jumpstart 63 g slurry + talc (500 g/100 kg) | 84 | 92 | 88 |
| 5 | Prosper Evergol + Jumpstart 315 g slurry + talc (500 g/100 kg) | 80.5 | 90.5 | 85.5 |

-continued

| Trt # | Treatment Description | Variety 1 | Variety 2 | Average |
|---|---|---|---|---|
| 6 | Prosper Evergol + Jumpstart 80 g slurry + talc (500 g/100 kg) | 82 | 89 | 85.5 |
| 7 | Untreated | 88 | 88 | 88 |

Treatments 2 and 4 as well as 3 and 5 comprise comparable amounts of *P. bilaii* spores, respectively. Treatment 6 corresponds to the recommended application rate.

The table above shows comparable germination rates for both the commercially available Jumpstart formulation and the dry formulation comprising spores of *P. bilaii* and talc powder.

Example 6: Viability of *Penicillium Bilaii* Spores After Application to Canola Seed Evaluation of on-seed viability of *Penicillium bilaii* on hybrid canola seed.

Hybrid canola seed was treated in a Hege 11 seed dresser with seed treatment formulations followed by mica (300 g/100 kg) and the treated seed stored at room temperature ~20° C. for 1 day.

To extract the spores from the seed surfaces, 5 g of seed was weighed and added to a 100 mL flask containing 45 mL of steril water +0.1% Tween. Flasks were put on a shaker platform for 30 mins at 200 rpm. 2 replicates were set up for each treatment.

A dilution block was prepared with 900 μL phosphate buffered saline (PBS) solution +0.1% Tween. The dilution series was carried out starting with 1mL of solution from the extraction flask to 1.00E-03. 100 μL from each dilution was then plated on PDA+Streptomycin Sulphate+Chloramphenicol+Triton X-100 plates; 2 replicates were plated for each sample (6 plates/sample). Plates were incubated in the dark at 20° C. for 5 days. Emerging colonies were marked, counted, and incubated further for confirmation. Calculations were then made to determine the number of colony forming units (CFUs) per gram of seed.

| | | Hybrid 1 | Hybrid 2 | AVERAGE |
|---|---|---|---|---|
| 1 | Prosper Evergol + [(*P. bilaii* spores + talc) (250 g/100 kg)] | 1.88E+06 | 3.04E+05 | 1.09E+06 |
| 2 | Prosper Evergol + [(*P. bilaii* spores + talc) (1250 g/100 kg)] | 2.13E+05 | 1.09E+05 | 1.61E+05 |

-continued

|   |   | Hybrid 1 | Hybrid 2 | AVERAGE |
|---|---|---|---|---|
| 3 | Prosper Evergol + Jumpstart 63 g slurry + talc (500 g/100 kg) | 1.63E+05 | 2.58E+04 | 9.41E+04 |
| 4 | Prosper Evergol + Jumpstart 315 g slurry + talc (500 g/100 kg) | 3.55E+05 | 7.43E+04 | 2.15E+05 |
| 5 | Prosper Evergol + Jumpstart 80 g slurry + talc (500 g/100 kg) | 1.18E+05 | 2.99E+04 | 7.38E+04 |

Treatments 1 and 3 as well as 2 and 4 comprise comparable amounts of *P. bilaii* spores, respectively. Treatment 5 corresponds to the recommended application rate.

This experiment shows that viability of the spores is improved compared to the viability of the experiments using Jumpstart.

The invention claimed is:

1. A method of treating seed, comprising
   a) applying a liquid comprising at least one seed treatment agent to said seed and
   b) applying a dry formulation comprising spores of the fungus *Penicillium bilaii* and talc powder to the seeds, wherein the at least one seed treatment agent is selected from the group consisting of a plant protection agent, a plant growth promoting agent, a seed coating agent or an inoculant.

2. The method of claim 1 wherein step a) and b) are performed simultaneously.

3. The method of claim 1, wherein the seed is selected from the group consisting of Canola, oilseed rape, wheat, soybean, cotton, sugar beet, beans, corn, alfalfa, peas, lentils, flax and barley seed.

4. The method according to claim 1, wherein the seed is Canola seed.

5. The method of claim 1, wherein said plant protection or plant growth promoting agent is a chemical agent.

6. The method of claim 1, wherein said plant protection agent is a biological control agent.

7. The method of claim 1, wherein said plant protection agent comprises a chemical agent selected from the group consisting of azoxystrobin, benzovindiflupyr, boscalid, cyprodinil, fludioxonil, fluxapyroxad, iprodione, metalaxyl, mefenoxam, metconazole, penthiopyrad, picoxystrobin, propiconazole, prothioconazole, pyraclostrobin, sedaxane, tebuconazole, penflufen, clothianidin, trifloxystrobin, cyantraniliprole, fluquiconazole, fluopyram, fluoxastrobin, flupyradifurone, thiamethoxam, chlorantraniliprole, sulfoxaflor, difenoconazole, picarbutrazox, ethaboxam, chlorantraniliprole, chlorpyrifos, deltamethrin, dimethoate, imidacloprid, cyazypyr, cyhalothrin-lambda, permethrin, spirotetramate, and tetraniliprole and a combination thereof and/or a biological agent selected from the group consisting of *Bacillus subtilis* strain QST713, *Bacillus subtilis* strain GB03, *Bacillus firmus* strain I-1582, *Bacillus pumilus* strain QST 2808, *Bacillus pumilus* strain GB34, and *Bacillus subtilis* strain MB600, and a combination thereof.

8. The method of claim 1, wherein said plant protection agent is in a liquid formulation.

9. The method of claim 1, wherein in step b) said seed is treated with a formulation consisting of spores of *P. bilaii* and talc powder.

10. A method according to claim 1 wherein the *Penicillium bilaii* spores and talc powder are provided in a ratio of between 1:100 and 1:10.

11. A method of improving plant growth, plant health or plant vigor comprising growing seed obtained by the method of claim 1.

12. A seed treated according to the method of claim 1.

13. A method of improving plant growth, plant health or plant vigor comprising growing the seed of claim 12.

* * * * *